(12) United States Patent
Bélanger et al.

(10) Patent No.: US 11,606,904 B2
(45) Date of Patent: Mar. 21, 2023

(54) APPARATUSES FOR COLLECTING THE ACROTELM OF PEAT BOGS

(71) Applicant: PREMIER HORTICULTURE LTÉE, Rivière-du-Loup (CA)

(72) Inventors: Bernard Bélanger, La Pocatière (CA); Guy Gagnon, Rivière-du-Loup (CA); Éric Houle, Rimouski (CA); Valérie Lavoie, Ste-Hélène-de-Kamouraska (CA); Jean-Luc Richard, St-Louis du Ha! Ha! (CA); Francis Pelletier, Témiscouata-sur-le-Lac (CA); Alexandre Cyr, Dégelis (CA); Stéphane Robert, Témiscouata-sur-le-Lac (CA)

(73) Assignee: PREMIER HORTICULTURE LTÉE, Rivière-du-Loup (CA)

( * ) Notice: Subject to any disclaimer, the term of this patent is extended or adjusted under 35 U.S.C. 154(b) by 0 days.

(21) Appl. No.: 17/978,639

(22) Filed: Nov. 1, 2022

(65) Prior Publication Data
US 2023/0059707 A1    Feb. 23, 2023

Related U.S. Application Data

(63) Continuation of application No. 17/435,391, filed as application No. PCT/CA2020/050458 on Apr. 8, 2020, now Pat. No. 11,523,570.

(30) Foreign Application Priority Data

Apr. 9, 2019    (CA) .................................. CA 3039879

(51) Int. Cl.
*A01D 45/00*    (2018.01)

(52) U.S. Cl.
CPC .................................. *A01D 45/00* (2013.01)

(58) Field of Classification Search
CPC ......... E21C 49/00; E21C 49/04; A01G 22/30; A01G 20/12; C10F 5/02; A01D 45/00;
(Continued)

(56) References Cited

U.S. PATENT DOCUMENTS

| 944,859 | A | * | 12/1909 | Harris | .................... | A01G 20/12 |
| | | | | | | 172/19 |
| 2,200,137 | A | * | 5/1940 | Steinert | .................. | E21C 49/02 |
| | | | | | | 37/3 |

(Continued)

FOREIGN PATENT DOCUMENTS

| CA | 2017199 | 11/1990 | | |
| CH | 240187 A | * 12/1945 | ............. | E21C 49/04 |

(Continued)

OTHER PUBLICATIONS

English Translation—Machine Translation of FR2417925A1, "Harrow for grassland—has transverse coupling bar which pivotally carries pairs of plane transverse blades with tined harrows behind them", published on Sep. 21, 1979.

(Continued)

*Primary Examiner* — Adam J Behrens
(74) *Attorney, Agent, or Firm* — Bereskin & Parr LLP/S.E.N.C.R.L., s.r.l.

(57) ABSTRACT

This disclosure describes a cutting unit for cutting sphagnum moss. The unit comprises a first pair of substantially parallel blades, laid out substantially according to a first orientation, and spaced apart from about 2 cm to about 30 cm and a second pair of blades, substantially parallel, laid out substantially in a second orientation, and spaced apart from about 40 cm to about 400 cm. The blades of the first pair and second pair being positioned and configured to cut said sphagnum moss.

22 Claims, 11 Drawing Sheets

(58) Field of Classification Search
CPC ...... A01D 34/00; A01D 34/001; A01D 34/01; A01D 34/015; A01D 44/00; A01D 44/02
See application file for complete search history.

(56) References Cited

U.S. PATENT DOCUMENTS

| | | | | |
|---|---|---|---|---|
| 2,658,290 | A | * | 11/1953 | Pierce ............... E21C 49/02 172/120 |
| 2,707,829 | A | * | 5/1955 | Fisk ................ A01G 20/12 56/247 |
| 3,395,467 | A | * | 8/1968 | Allen ............... A01D 44/00 37/195 |
| 3,825,199 | A | | 7/1974 | Nisula |
| 4,018,287 | A | | 4/1977 | Brouwer |
| 4,270,586 | A | | 6/1981 | Hyde et al. |
| 4,495,716 | A | * | 1/1985 | Finan ............... E21C 25/24 198/640 |
| 4,656,819 | A | | 4/1987 | Pearson |
| 4,738,036 | A | * | 4/1988 | Belanger .............. E02F 3/92 56/DIG. 15 |
| 5,274,924 | A | | 1/1994 | Lee |
| 5,477,627 | A | * | 12/1995 | Nolin ................ C10F 5/02 37/444 |
| 5,699,619 | A | | 12/1997 | Sundström |
| 6,279,665 | B1 | * | 8/2001 | Devaney ............. A01G 20/12 172/19 |
| 8,353,118 | B2 | * | 1/2013 | Noel ............... E21C 49/02 37/3 |
| 11,523,570 | B2 | | 12/2022 | Bélanger et al. |
| 11,547,034 | B2 | * | 1/2023 | Fay, II ............. A01D 75/004 |
| 2009/0090093 | A1 | * | 4/2009 | Pellenc ............. A01G 3/0408 56/10.2 G |
| 2011/0155283 | A1 | | 6/2011 | Leist |
| 2022/0142061 | A1 | | 5/2022 | Bélanger et al. |

FOREIGN PATENT DOCUMENTS

| | | | | |
|---|---|---|---|---|
| CH | 582822 | A5 | * 12/1976 | ............. E21C 49/04 |
| CN | 108307783 | A | * 7/2018 | ............. A01D 45/00 |
| DE | 19906944 | A1 | 8/2000 | |
| EP | 2460398 | A2 | 6/2012 | |
| FR | 2417925 | | 9/1979 | |
| GB | 190928709 | A | * 10/1910 | ............. E21C 49/04 |
| GB | 2057536 | A | * 4/1981 | ............. A01B 45/04 |
| GB | 1598902 | A | * 9/1981 | ............. E21C 49/00 |
| RU | 2629612 | | 8/2017 | |
| WO | WO-2009112640 | A1 | * 9/2009 | ............. C10F 5/02 |
| WO | WO-2009118458 | A1 | * 10/2009 | ............. C10F 5/02 |

OTHER PUBLICATIONS

English Translation—Machine Translation of RU2629612C1, "Electromechanical device for cutting sphagnum moss with several cutting edges", published on Aug. 30, 2017.

Miller et al., "A European Feather Moss, Pseudoscleropodium purum, Naturalized Widely in New York State in Cemeteries", The Bryologist, 104(1): 98-103 (Mar. 1, 2001).

English Translation—Machine Translation of DE19906944A1, "Method and machine for cultivating asparagus involves cutter, and intermediate conveyor", published on Aug. 31, 2000.

Rowan P. Buxton, "Identifying the environmental effects of sphagnum moss harvesting on wetlands", Landcare Research, Prepared for West Coast Regional Council, Aug. 2017.

* cited by examiner

APPARATUSES FOR COLLECTING THE ACROTELM OF PEAT BOGS

REFERENCE TO RELATED PATENT APPLICATIONS

The present application is a continuation application of U.S. Ser. No. 17/435,391, filed on Oct. 7, 2021, that is a 35 USC 371 national stage entry of PCT/CA2020/050458, filed on Apr. 8, 2020, and which claims priority to Canadian Application No. 3,039,879, filed on Apr. 9, 2019. These documents are hereby incorporated herein by reference in their entirety.

FIELD OF DISCLOSURE

The field of this invention relates to methods and apparatus for harvesting sphagnum moss. For example, such methods and apparatus may be used so as to harvest in a sustainable manner and with minimal impact on the environment.

STATE OF THE ART

Peat bogs are wetlands of great ecological and economic value. Many uses are associated with them, some of them commercial. These include the extraction of peat for off-site uses, whether for purposes of energy, absorption, filtration or, more broadly, as a growing medium. For horticultural uses, although devoid of nutrients, the water capacity, the rigidity of its structure and the porosity of peat make it a sought-after raw material. On the other hand, its exploitation leads to the depletion of the resource and the degradation of peat bogs over time.

Peat bogs form where the rate of accumulation of organic matter is greater than the rate at which it decomposes. Hence, the importance of removing only that which is necessary in order to ensure the preservation of the resource and the balance of the ecosystem.

Although collection and rehabilitation techniques have evolved in recent years, none of them allow the gathering of biomass without interfering with the sustainability of the environment.

Currently, the usual preparation techniques include drainage, a necessary step for exploitation activities, which includes the cutting of vegetation and drawing down the water table with ditches. Following drying up, and once the plot is firm enough to support the machinery, the next step is to clean and level the area.

For the extraction of peat, once the gathering area is well prepared, the most common method consists in decompacting the first centimeters of soil with a harrow, this to expose the first centimeters. This operation helps the peat to dry out under the combined effect of wind and sun, and facilitates the gathering with a towed vacuum harvester, which removes this thin layer. The resulting stacks are then transported to the plant where they are cleaned of unwanted material (branches, roots, etc.). Once done, the peat is packaged, alone or in a mixture, and shipped to the markets.

Although common and widespread, these industrial exploitation practices progressively deplete the resource and, in the long run, become highly invasive and disruptive to the environment, if only because of the impact of heavy vehicles circulating there and the resulting soil compaction.

This situation has led a growing number of countries to enact strict standards to regulate this industry and minimize its negative aspects.

The sustainability of the resource and the maintenance of this ecosystem depend on the choice of the mode of extraction.

Peat bogs that are exploited do not easily return to their initial state without human intervention in terms of rewetting (hydrology) and reintroduction of vegetation cover, mainly sphagnum moss.

Since peat accumulates at an average rate of 0.5 to 1 mm per year (mainly at the latitude of eastern Quebec, Canada), even if restored, it is unrealistic to think that, after exploitation, a peat bog could again allow a second commercial extraction in a so-called near future of several hundred or thousand years.

Approaches aimed at minimizing the negative environmental footprint do exist. For example, in the peat bogs of the province of Magallanes, Chile, the harvesting of surface sphagnum or of sphagnum moss (and not of peat) is done manually, with a fork and applied at a depth of no more than 25 cm. The extraction is done section by section and 20% to 30% of the initially present material is left on site to promote the regeneration of the environment.

Likewise, for commercial exploitation, mechanized harvesting equipment, developed by the Finnish company Novarbo Biolan/BRT Solutions Ltd, allows access to shallow bogs and makes the extraction of the surface sphagnum found there possible. Even if the method avoids drainage of the gathering area, it remains invasive if only because of the pressure exerted on the soil by the tracks and the manner in which the sphagnum is removed (i.e. literally ripped out) from the environment, leaving the soil devastated and bare.

Indeed, both of the solutions described above have notable shortcomings: for the Chilean solution, although sustainable, there is no commercial profitability; for the Finnish solution, although economically viable, the initial integrity of the environment is compromised and the regeneration of the resource for a subsequent sustainable and repeated harvest in the short or medium term (for example 15 to 20 years) is lacking.

Hence the need for an apparatus and/or a method that avoids at least one of the disadvantages of the prior art technologies.

SUMMARY OF THE DISCLOSURE

According to one aspect, this disclosure relates to a method of removing sphagnum moss comprising motorized cutting and a removal of at least a portion of the sphagnum moss in which the cutting is performed, in a direction substantially parallel to the ground.

According to another aspect, this disclosure relates to a method of removing sphagnum moss comprising motorized cutting and a removal of at least a portion of the sphagnum moss in which the cutting is performed in a direction substantially parallel to the ground while leaving the sphagnum moss anchored to the ground.

According to another aspect, this disclosure relates to a method of removing sphagnum moss comprising motorized cutting and a removal of at least a portion of the sphagnum moss in which the cutting is performed in a direction substantially parallel to the ground and in a direction substantially vertical to the ground, while leaving the sphagnum moss anchored to the ground.

According to another aspect, this disclosure relates to a cutting unit comprising at least one pair of blades sized to allow a removal of an intermediate portion of sphagnum moss at upper and lower ends of the intermediate portion, but without however tearing the sphagnum moss from the ground.

According to another aspect, this disclosure relates to a cutting unit comprising at least one blade for making a substantially horizontal cut to allow the cutting of a portion of sphagnum moss at a lower or intermediate location of the sphagnum moss, but without however tearing the sphagnum moss from the ground, and at least one blade for making a substantially vertical cut of the sphagnum moss.

According to another aspect, this disclosure relates to a cutting unit comprising a first pair of substantially parallel blades laid out substantially in a first orientation and spaced apart from each other about 2 cm to about 30 cm and a second pair of substantially parallel blades substantially laid out in a second orientation and spaced apart from each other about 40 cm to about 400 cm.

According to another aspect, this disclosure relates to a sphagnum moss harvesting system comprising a cutting unit as described in this disclosure, and a motor for moving said cutting unit.

According to another aspect, this disclosure relates to the use of a cutting unit with motorized travel and comprising a chainsaw for cutting the sphagnum moss for the purpose of removing the moss without however tearing the sphagnum moss from the ground.

According to another aspect, this disclosure relates to the use of a cutting unit with motorized travel and comprising a chainsaw for cutting the sphagnum moss for the purpose of removing an intermediate portion disposed above the ground.

According to another aspect, this disclosure relates to the use of a cutting unit with motorized travel and comprising a chainsaw for cutting the sphagnum moss for the purpose of removing an intermediate portion disposed above the ground, said cutting being performed in a direction substantially horizontal to the upper and lower ends of said intermediate portion while still leaving the sphagnum moss anchored to the ground and while redepositing an apical portion on the ground.

The methods, devices and uses discussed above provide several advantages over the technological solutions proposed in the prior art. Some of these advantages are listed below.

1—Maintenance of Microbial, Faunal and Plant Communities on the Surface of Sphagnum Bogs For the removal of sphagnum moss, the method and apparatus that are the subject matter of this disclosure allow for the maintenance of floristic diversity and the preservation of the plant communities that develop there, since the approach favors the rapid return of the plant cover as well as that of the whole of the characteristic vegetation of a so-called "natural" peat bog. This premise is based on observations of the environment and on the realistic assumption that only a portion of the acrotelm is removed, without affecting the vitality of the sphagnum that remains anchored to the ground. Furthermore, it is envisaged to further stimulate regrowth by returning the apical portion of the gathered sphagnum to the ground, so as to increase the rapid recovery of the vegetation and to preserve the whole propagule bank specific to the site.

At the same time, the approach proposed in this disclosure accelerates the return of fauna belonging to so-called "natural" peat bogs and preserves the diversity of its fauna. It achieves this by preserving the surface area following the harvesting of sphagnum and by maintaining the hydrology of the subsoil intact. Their habitat being preserved, the animal species continue to find the elements necessary for their survival in these places in terms of shelter, food and reproduction.

Current knowledge makes it difficult to compare the different microbiota present in complex peat bog ecosystems. Nevertheless, it is plausible to think that with a respectful approach such as the one described in this disclosure, which better preserves the integrity and sustainability of the gathering area in terms of its faunal, botanical and hydrological aspects, the already present native microbial flora is indeed preserved.

One year after the gathering according to the methods of this disclosure and using the units and systems presented in it, the harvest sites show a rate of vegetation recovery approaching 100% and no significant change in the floristic population has been observed. It is clear that these initial data need to be corroborated and that more comprehensive characterization measurements, relating to the biodiversity of the environment, be undertaken in the coming years.

2—Preservation of the Role of Peat Bogs as Carbon Sinks.

Following the harvest of sphagnum moss using the proposed methods and devices, a level of carbon capture (C) equivalent to or greater than that recorded in the natural environment is expected, this at least for the vast majority of existing peat bogs. Even in the case of exceptionally emissive wetlands with unusual carbon exchange patterns, such as the peat bogs of the Rivière-du-Loup region, a decrease in carbon released was observed only one year after harvesting the sphagnum. The average rate of carbon dioxide ($CO_2$) release went from 20 g $CO_2$ $m^{-2}$ $day^{-1}$, for pristine unexploited areas, to 9 g $CO_2$ $m^{-2}$ $day^{-1}$ for the harvested sections. Thus, there is reason to believe that for peat bogs with a typical carbon exchange flow pattern, $CO_2$ sequestration is likely to be greater than that encountered in a so-called pristine area.

The methods and devices of this disclosure also allow the preservation of carbon accumulated over the years, trapped in the organic matter that is the peat, in massive quantities, in particular in the catotelm. The carbon sequestered in the catotelm remains there: the gathering only being carried out here in the acrotelm of the peat bogs, without need of draining water or lowering the water table, the whole while preserving the living plant cover.

In order to confirm these assumptions, over the next few years, from the initial harvest period to the complete renewal of the sphagnum moss that is ready for a second gathering, monitoring over time and on different types of bogs will be undertaken, with emphasis on the analysis of carbon fluxes ($CO_2$ and $CH_4$) present in the peat bogs.

3—Methods and Devices Intended for Harvesting Sphagnum Moss in a Renewable Manner and with Minimal Impact on the Environment.

It is believed that the technology in this disclosure will allow for the renewal of the sphagnum raw material and the sustainable use of the gathering area over time. It is estimated that the complete renewal of the material will occur over a time period of 5 to 10 years. One year after harvest, the sites are already showing a clear rate of recovery. The actual time required for renewal will be confirmed over the next few years.

Since no intervention is made to alter the water table, this practice greatly minimizes impacts on hydrology. It also avoids the release of sediments into the surrounding waters via drainage channels, a common practice in conventional peat bog operations. All this is in addition to preserving the hydro-ecological functions of the harvest area. Through gathering, the peat bog is maintained in a constant state of development. Phenomena related to the senescence of organisms and the environment are slowed down or greatly delayed. These conditions increase carbon capture, facilitate water management during heavy precipitation and avoid spillover from the watershed.

BRIEF DESCRIPTION OF THE FIGURES

The figures of this disclosure illustrate various examples in a non-limiting manner.

DETAILED DESCRIPTION OF THIS DISCLOSURE

Figure 1:
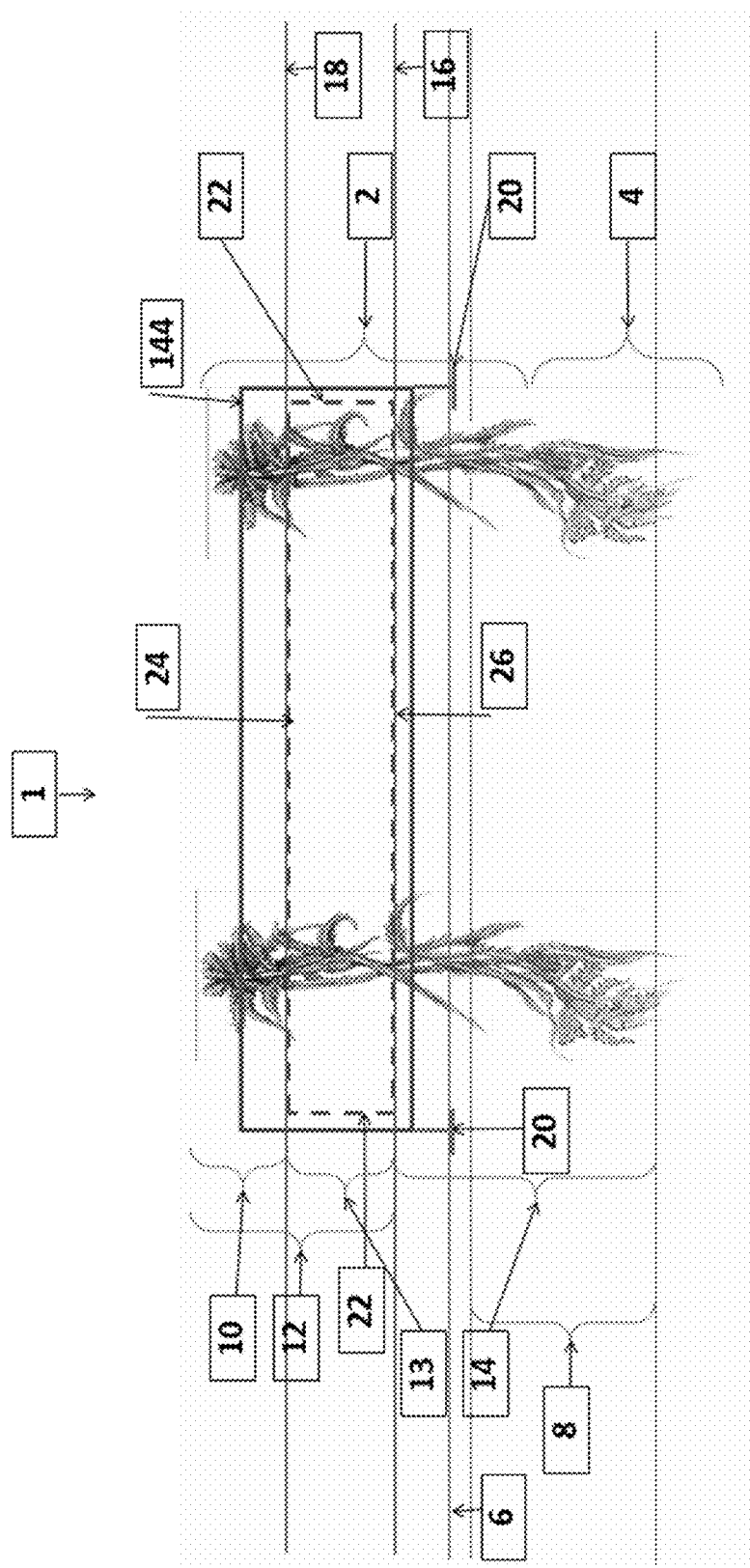
FIG. 1 shows a cutting diagram of a method according to an example of this disclosure.

The examples presented in this disclosure are presented in a non-limiting manner.

The term "while leaving the sphagnum moss anchored to the ground" as used in this disclosure means that a portion of the sphagnum moss is removed by cutting while leaving the sphagnum moss anchored to the ground over at least 90% of the harvested surface, at least 95% of the harvested surface or even 99% of the harvested surface. The person skilled in the art will understand that due to the irregularities of the terrain (and its components), where the sphagnum moss is harvested (in peat bogs), it is possible that the equipment used might catch or accidentally come into contact with the sphagnum moss on the ground and that a portion of it is damaged and ripped out. The person skilled in the art will understand that in a theoretical situation of perfectly flat ground and without components modifying this perfectly flat character, such a cutting and harvesting would be carried out without however ripping out the sphagnum moss, which is to say that only a cutting and a gathering of the intermediate portion of the moss would be carried out. For example, the removal of an intermediate portion located, for example, on top of the ground and comprising the apical portion can be carried out. According to another example, removal of a portion located on top of the ground and comprising the apical portion may be considered.

For example, the cut may be performed in a direction at least substantially horizontal to the upper and lower ends of an intermediate portion while leaving the sphagnum moss anchored to the ground and redepositing an apical portion on the ground.

For example, the cutting may be performed with at least one blade or saw.

For example, the cutting may be performed with at least one chainsaw.

For example, the cutting may be performed with at least two chainsaws.

For example, the cutting may be further performed in a direction that is substantially vertical.

For example, the cutting may be further performed in a direction at least substantially horizontal to the upper and lower ends of the intermediate portion by means of a chainsaw and a cutting is also performed in a direction that is substantially vertical by means of a blade or saw.

For example, the cutting and/or collection may be performed in a motorized manner while concurrently exerting a ground pressure of about 2.5 to about 35 kPa, about 3 to about 15 kPa, about 3 to about 10 kPa, about 3 to about 7 kPa, about 3 to about 5 kPa, or about 4 to about 5 kPa.

For example, the cutting may allow for a collection of the acrotelm of ombrotrophic, minerotrophic, or mixed peat bogs.

For example, the cutting allows for a collection of the acrotelm in an ombrogenic, soligenic, topogenic, limnogenic, or telmatogenic peat bog.

For example, the cutting allows for a collection of the acrotelm from an alkaline (known as carex) peat bog or an acidic (known as sphagnum) peat bog.

For example, the cutting may be performed by horizontal sawing at a cutting angle of about 0° to about 10° with respect to the ground or about 0° to about 5° with respect to the ground.

For example, the cutting made at the upper end of the intermediate portion may be made at a cutting angle of about 0° to about 10° with respect to the ground and the cutting made at the lower end of the intermediate portion may be made at a cutting angle of about 0° to about 10° with respect to the ground.

For example, the cutting made at the upper end of the intermediate portion may be made at a cutting angle of about 0° to about 5° with respect to the ground and the cutting made at the lower end of the intermediate portion may be made at a cutting angle of about 1° to about 5° with respect to the ground.

For example, the cutting may be made to collect a portion measuring from about 2 cm to about 40 cm, about 3 cm to about 30 cm, about 5 cm to about 20 cm, or about 8 cm to about 12 cm.

For example, the cutting may be performed at a predetermined distance between the upper and lower ends of an intermediate portion so as to take an intermediate portion measuring from about 2 cm to about 40 cm, about 3 cm to about 30 cm, about 4 cm to about 25 cm, about 5 cm to about 25 cm, about 5 cm to about 20 cm, about 7 cm to about 17 cm, about 7 cm to about 15 cm or about 8 cm to about 12 cm.

For example, the cutting may be performed having a saw speed of at least 50 meters per minute, about 50 to 400 meters per minute, about 60 to about 300 meters per minute, about 75 to about 250 meters per minute, about 100 to about 250 meters per minute, about 150 to about 250 meters per minute, or about 180 to about 220 meters per minute.

For example, a sprocket may be rotated, said sprocket may have a radius of about 1 to about 15 cm, about 2 to about 13 cm, or about 4 to about 12 cm.

For example, the cutting may be performed by a saw.

For example, the cutting may be made by a chainsaw.

For example, the cutting made may comprise a vertical cut made at an angle of more or less 45° relative to a vertical axis, more or less 20° relative to a vertical axis, more or less 10° relative to a vertical axis, or more or less 0° relative to a vertical axis.

For example, the cutting made may comprise a vertical cut made at two locations independently at an angle of more or less 45° relative to a vertical axis at each of the locations, independently at an angle of more or less 20° relative to a vertical axis at each of the locations, independently at an angle of more or less 10° relative to a vertical axis at each of the locations, or independently at an angle of more or less 0° relative to a vertical axis at each of the locations.

For example, the cutting made may comprise a vertical cut made with a distance of about 40 to about 400 cm between the two locations, about 50 to about 150 cm between the two locations, about 60 to about 120 cm between the two locations, or about 80 to about 100 cm between the two locations.

For example, the collection may be performed by a conveyor.

For example, the method may further comprise dewatering and draining the collected intermediate portion.

For example, a pressure of about 25 to about 750 kPa, from about 30 to about 700 kPa, from about 40 to about 600 kPa, may be applied to the sphagnum moss.

For example, a dewatering and/or draining unit may be integral or, separate part of, or may be attached to, equipment for the cutting or collection of the sphagnum moss.

For example, the method may be performed by motorized movement of a cutting unit which allows for the simultaneous performance of the horizontal cutting at the upper and lower ends of the intermediate portion of the sphagnum moss, and a vertical cut at two locations separated by a predetermined distance.

For example, the movement of the cutting unit may be performed on an movable bridge.

For example, the movable bridge may support a cutting unit resting at ends on two parallel movable rails, said rails may or may not be provided with a transport unit for conveying the harvested material.

For example, the movement of the cutting unit may be performed by a towed or self-propelled equipment.

For example, movement of the cutting unit may be accomplished using a modular ramp.

For example, the modular ramp may comprise a base that allows for distribution of the weight on the sphagnum moss.

For example, the harvested sphagnum moss may undergo swelling.

For example, the harvested sphagnum moss may temporarily be stored directly at a gathering site.

For example, the harvested sphagnum moss may be temporarily stored directly at a gathering site with protection from poor weather.

For example, the method may further comprise, drying, swelling, cutting, sieving, mixing, bagging, and/or storing.

For example, the method may comprise an average gathering speed of about 0.1 to about 1.5 km/hour, about 0.2 to about 1.2 km/hour, about 0.3 to about 1.1 km/hour, or about 0.5 to about 1.0 km/hour.

For example, the method may comprise a gathering volume of about 250 to about 1500 $m^3$/hectare, about 300 to about 1,300 $m^3$/hectare; about 400 to about 1,200 $m^3$/hectare, or about 500 to about 1,100 $m^3$/hectare.

For example, the sphagnum moss may be collected in alternating strips.

For example, the sphagnum moss may be collected in a continuous form.

For example, the method can be performed in a minerotrophic, ombrotrophic, or mixed peat bog.

For example, the cutting may be performed using a saw, chisel, cleaver, laser, knife, or blade.

For example, the cutting may be performed at a rotational speed of about 200 to about 2000 rpm, about 400 to about 1800 rpm, about 600 to about 1600 rpm, or about 700 to about 1500 rpm. For example, a sprocket may be subjected to said rotation, said sprocket may have a radius of from about 1 to about 15 cm, from about 2 to about 13 cm or from about 4 to about 12 cm.

For example, said pressure may be exerted for a period of time from about 1 to about 60 seconds, from about 2 to about 45 seconds, or from about 5 to about 30 seconds.

For example, in the cutting unit, the first orientation may be horizontal.

For example, in the cutting unit, the second orientation may be vertical.

For example, in the cutting unit, the first pair of blades may be a pair of chainsaws.

For example, the chainsaws may be arranged such that the first pair of blades comprises a first chainsaw disposed above a second chainsaw, the first chainsaw may be disposed horizontally and may be advanced with respect to the second chainsaw such that when the cutting unit contacts an item to be cut, said item first contacts the first chainsaw and said item then contacts the second chainsaw.

For example, the second pair of blades may be a pair of chainsaws.

For example, the second pair of blades may be a pair of circular blades.

For example, the second pair of blades may be a pair of shear blades.

For example, the harvesting system may furthermore comprise a rail system for supporting said cutting unit.

For example, the harvesting system may further comprise a conveyor for conveying the sphagnum moss.

For example, the harvesting system may furthermore comprise at least one roller allowing dewatering.

For example, the harvesting system may furthermore comprise rollers allowing dewatering.

For example, the harvesting system may furthermore comprise cylinders allowing for pre-dewatering.

For example, the method may be performed by means of a cutting unit as described in this disclosure.

Harvesting Principle

For example, the disclosure relates to a method intended for the gathering of live sphagnum moss, comprising a motorized cutting and a gathering of at least a portion of the peat in which the cutting is performed at least in a direction substantially parallel to the ground, this while leaving the sphagnum moss anchored to the ground; the cutting unit exerting, for example, a pressure on the gathering area of less than 40 kPa or 35 kPa.

Table 1 lists various elements of an example shown in FIG. 1.

TABLE 1

| NUMBER | ELEMENT | DESCRIPTION |
|---|---|---|
| 2 | Acrotelm | A layer of a peat ecosystem that is constantly or periodically under aerobic conditions, characterized by fluctuations in the water table, and exhibits rapid decomposition of the organic matter. |
| 4 | Catotelm | The bottom layer of peat that is permanently below the water table. Under these anaerobic conditions, the microbial activity and decomposition processes of the peat are slower than in the acrotelm. |
| 6 | Ground | Where the base of the cutting unit rests. |
| 8 | Water table | Shallow groundwater reserve |
| 10 | Apical portion | Upper portion of the aerial part of the plant, location of the genesis of the location of the new organs. |
| 12 | Aerial part | Part of the plant located above the lower horizontal cut. |
| 13 | Intermediate portion | Portion of the acrotelm harvested for a two-plane cut. |
| 14 | Lower portion | Part of the plant located under the lower horizontal cut. |
| 16 | Cutting plane No. 1 | Lower horizontal limit of the live sphagnum moss cut. |
| 18 | Cutting plane No. 2 | Upper horizontal limit of the live sphagnum cut, without contribution from the apical portion. |
| 20 | Mobile bases | Supporting rod that distributes the weight of the harvesting unit frame to the ground. |
| 22 | Vertical cut | Cut carried out on both sides of the intermediate portion. |
| 24 | Upper end | End bounded by the cutting plane No. 1. |
| 26 | Lower end | End bounded by the cutting plane No. 2. |

FIG. 1 shows a simplified representation of the gathering area (1), consisting of the acrotelm (2), the catotelm (4) and a water table (8) that fluctuates according to rainfall and evapotranspiration. The chassis frame of the cutting unit (144) rests thereupon on supporting rods which serve as mobile bases (20) and distribute the weight of the load on the ground (6), According to the chosen mode of operation, two parallel and distant blades allow a horizontal cut at the lower (26) and upper (24) ends of the intermediate portion of the harvested live sphagnum moss (13), which corresponds respectively to the cutting plane No. 1 (16) and the cutting plane no. 2 (18). The intervention is completed by a second cutting (22); a cutting performed vertically on both sides of the intermediate portion. According to another operation mode, a single horizontal cut can be made at the lower end, which corresponds to cutting plane No. 1. In this case, the aerial part of the sphagnum plant (12) is removed, including the apical portion (10), leaving a lower portion of the plant (14) anchored to the ground. Regardless of the method of operation chosen, the sphagnum moss remains alive and attached to the ground, which is to say, it is not ripped out.

Cutting Unit

A cutting unit as well as a harvesting system comprising such a cutting unit are described herein, said system being suitable for collecting sphagnum moss. Indeed, the harvesting system allows a cutting and a collection of a portion of said moss; the collection carried out from the aerial portion of the sphagnum moss, with or without returning the apical portion of the sphagnum moss thus harvested to the ground.

Figure 2:
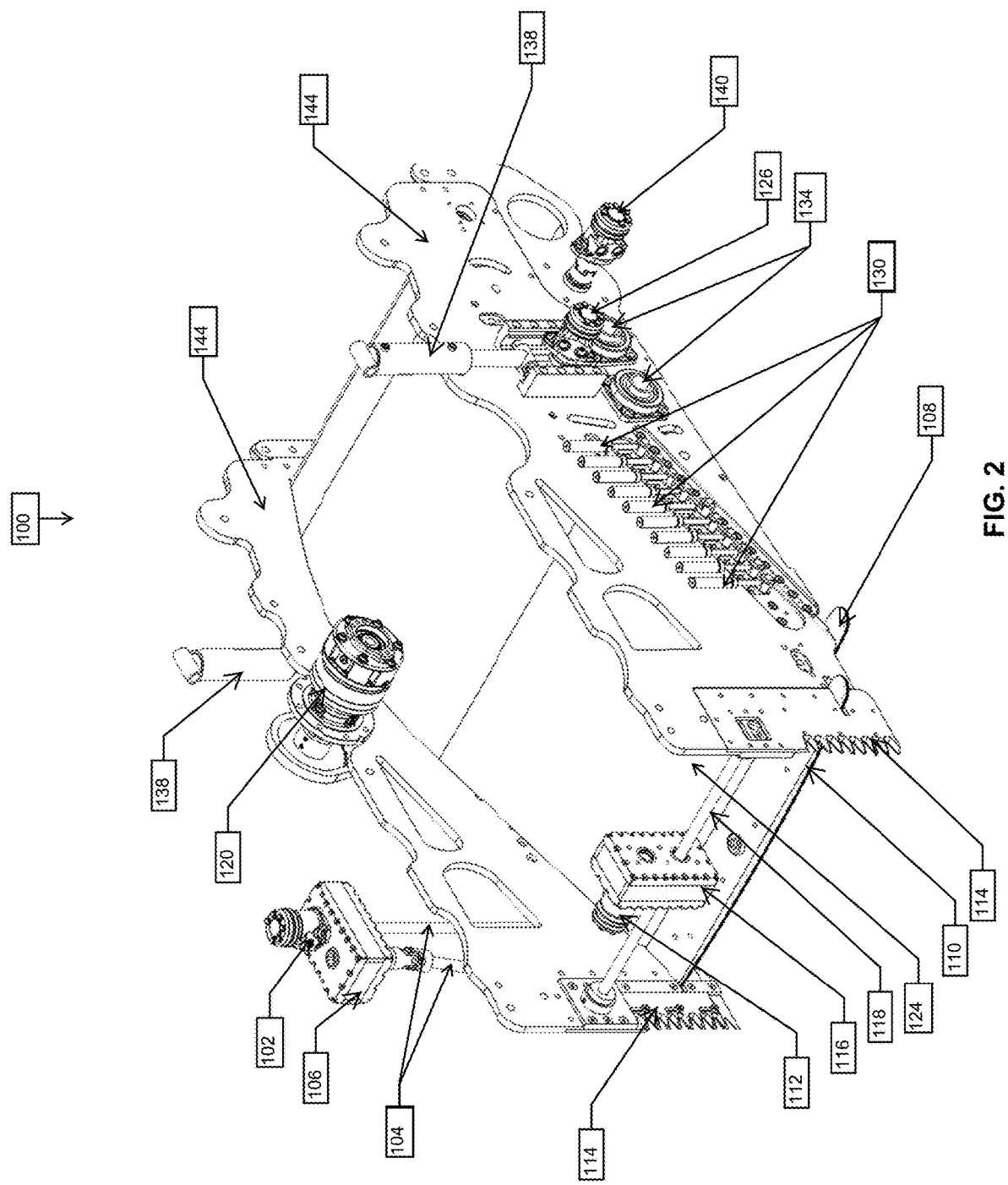
FIG. 2 is a perspective view of a cutting unit according to an example of this disclosure.
Figure 3:
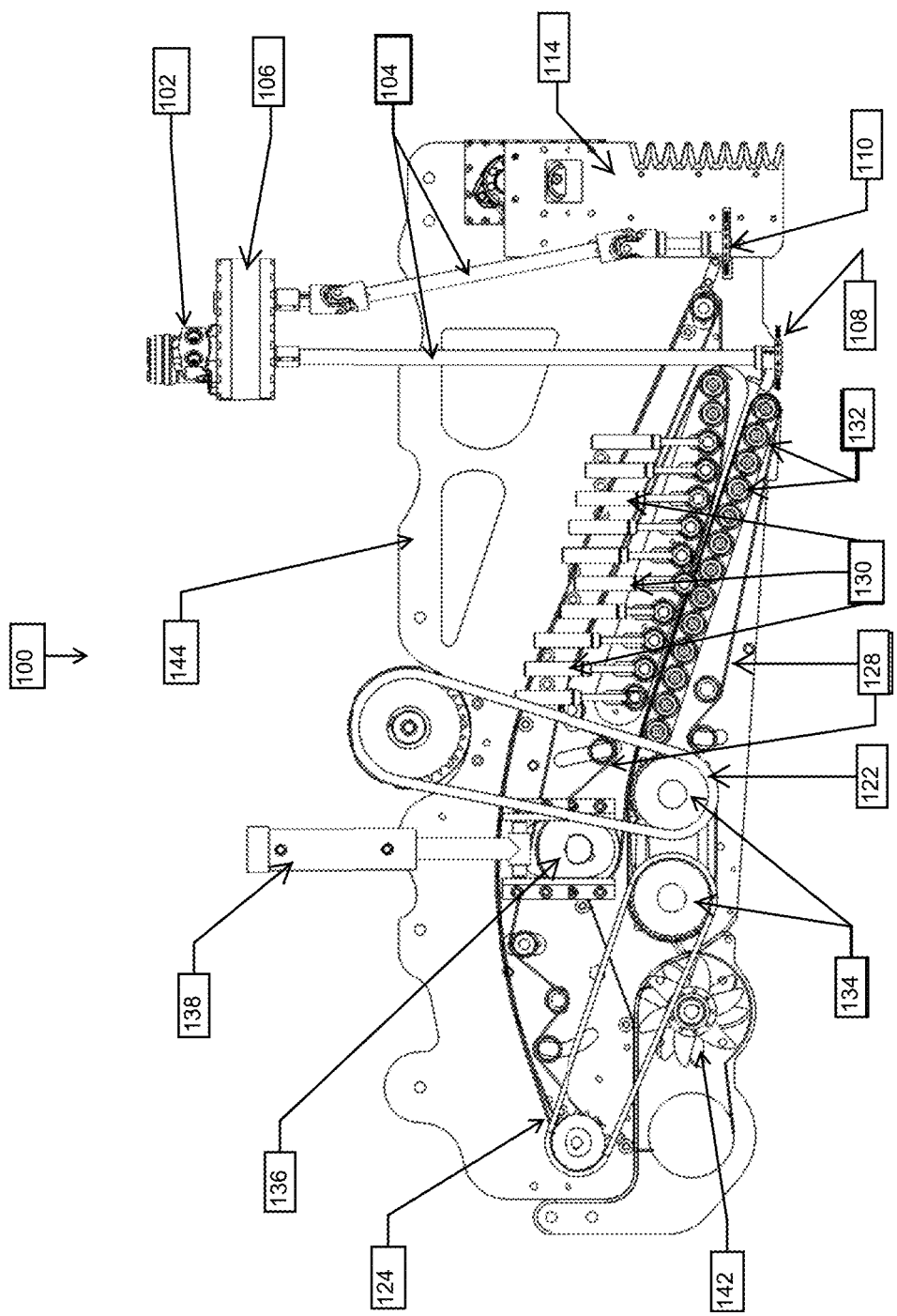
FIG. 3 is a side view of the cutting unit of FIG. 2.

Table 1 lists various elements of an example shown in FIG. 2 and FIG. 3.

TABLE 2

| Number | Component | Description |
|---|---|---|
| 102 | Motor (1) | Motor intended for driving chainsaws. |
| 104 | Transmission shaft (2) | Transmission shaft that transmits the driving force from the motor to the chainsaw. |
| 106 | Gearbox | Gearboxes that regulate the speed of the chainsaws. |
| 108 | Chainsaw blade | Blade that allows a lower horizontal cut. |
| 110 | Chainsaw blade | Blade that allows an upper horizontal cut. |
| 112 | Motor (1) | Motor intended to drive the two shears. |
| 114 | Shears (2) | Blades that allows a vertical cut. |
| 116 | Gearbox | Gearboxes that regulates the operating speed of the shears. |
| 118 | Transmission shaft | Transmission shaft that transmits the driving force of the motor to the two shears. |
| 120 | Motor (1) | Motor intended to drive the belt for the transport of the harvested material and the lower dewatering belt. |
| 122 | Drive chains or belts (3) | Drive chains or belts that transmit the driving force of the motor to the transport belt. |
| 124 | Transport belt (1) | Transport belt for the transport of the reseeding material. |
| 126 | Motor (1) | Motor intended to drive the upper dewatering belt. |
| 128 | Dewatering belts (2) | Perforated belts, intended to allow the drainage of the excess water resulting from the pressure exerted by the dewatering rollers. |
| 130 | Gas cylinders (10) | Gas cylinders that allow a constant pressure to be exerted during pre-dewatering. |
| 132 | Pre-dewatering rollers (10) | Rollers intended to extract, by pressure on the plant material, a first volume of water contained in the harvested sphagnum. |
| 134 | Dewatering rollers (32) | Lower dewatering rollers intended to extract, by pressure on the plant material, an additional volume of water contained in the harvested sphagnum. |

TABLE 2-continued

| Number | Component | Description |
| --- | --- | --- |
| 136 | Dewatering rollers (1) | Upper dewatering rollers intended to extract, by pressure on the plant material, an additional volume of water contained in the harvested sphagnum. |
| 138 | Hydraulic cylinder (2) | Hydraulic cylinder for the control of the dewatering pressure generated by the rollers. |
| 140 | Motor (1) | Motor intended to operate the swelling system. |
| 142 | Sweller (1) | System that allows volume to be given to the harvested material. |
| 144 | Frame | Chassis frame of the harvesting unit |
| 146 | Chute | System allowing for the redeposit on the ground of the apical portion of the sphagnum. |

As shown in FIG. 2 and FIG. 3, the cutting unit (100) comprises a first hydraulic motor (102) the driving force of which is transmitted by means of transmission shafts (104), whose speed is regulated by means of a gearbox (106). These drive shafts drive a chainsaw blade (108) for the lower horizontal cut (26) (see FIG. 1) and a chainsaw blade (110) for the upper horizontal cut (24) (see FIG. 1).

The cutting unit (100) comprises a second hydraulic motor (112), intended to drive a pair of shears (114), placed on each side of the cutting unit, this in order to allow the vertical cut (22) (see FIG. 1) of the harvested sphagnum portion. The driving force of this hydraulic motor (112) is transmitted by means of a transmission shaft (118), the speed of which is regulated by means of a gearbox (116).

The cutting unit (100) comprises a third hydraulic motor (120) for driving the lower dewatering belts by directly activating the lower dewatering rollers (134). This hydraulic motor (120) likewise imparts the driving force necessary to operate the transport belt (124) used for the transport of the apical portion of the sphagnum that is replaced on the ground, this by means of transmission chains or belts (122). The cutting unit (100) comprises a fourth hydraulic motor (126) intended to drive the upper dewatering belt. This hydraulic motor (126) likewise directly imparts the driving force necessary to operate the upper dewatering roller (136). Both the upper and lower belts (128) are perforated, this in order to let the excess water flow from the pressure exerted by the dewatering rollers (134, 136) on the collected sphagnum. This pressure on the dewatering rollers is adjustable thanks to the force exerted on them by the hydraulic cylinders (138) positioned on either side of the cutting unit. Concurrently, the harvested sphagnum moss undergoes a pre-dewatering. To achieve this, a series of gas cylinders (130) exert a constant pressure on the harvested material by means of the pre-dewatering rollers (132).

The cutting unit (100) comprises a fifth hydraulic motor (140), intended to operate the swelling system (142), a component used to free up the sphagnum moss to increase its volume. The unit is mounted on a frame (144) as described in FIG. 2 and FIG. 3.

Figure 10:
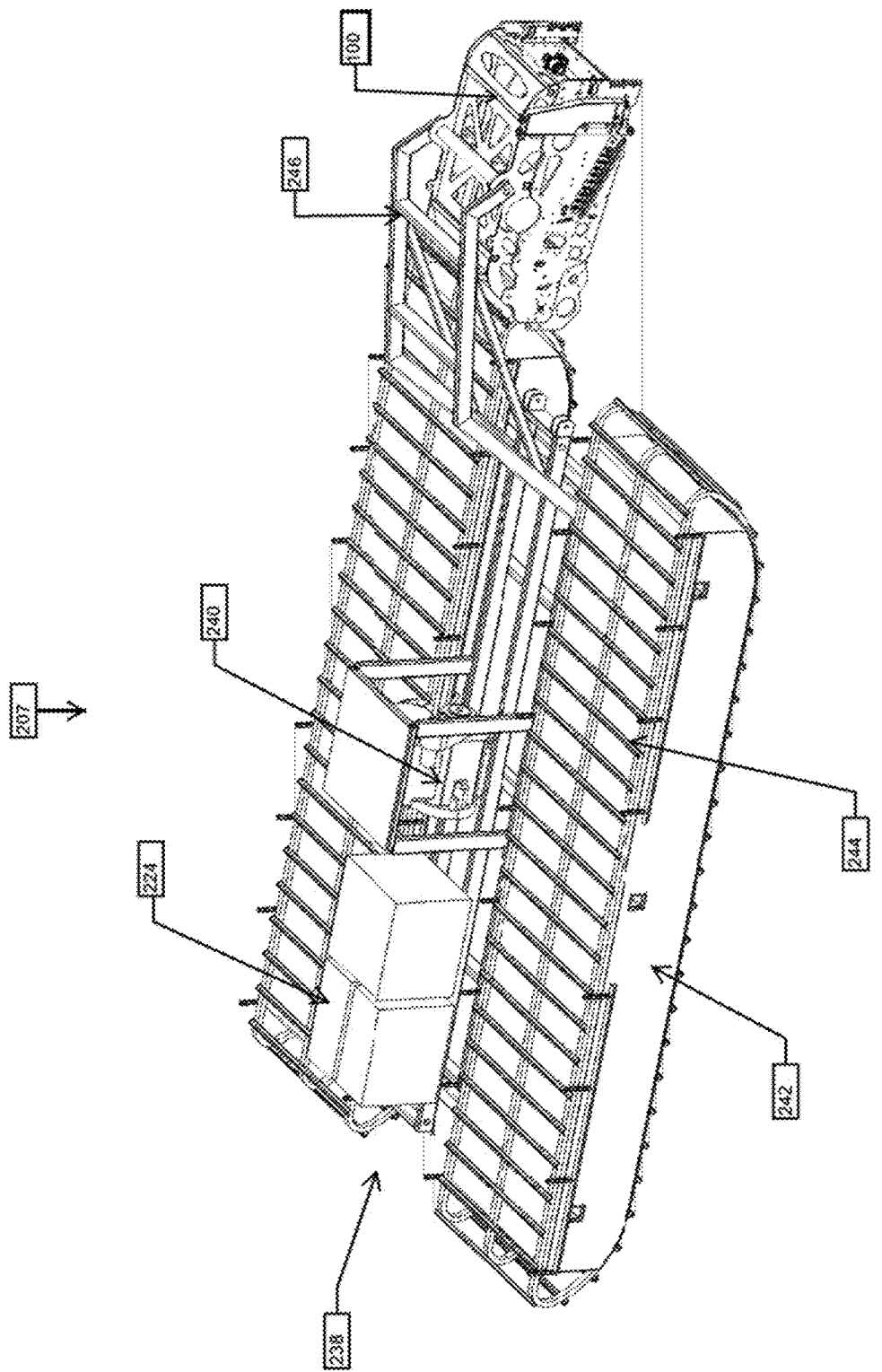
FIG. 10 is a perspective view of a harvesting system according to another example of this disclosure comprising a mode propelled by tracks.

The cutting unit (100) can be integrated into various harvesting systems. For example, the cutting unit (100) can be incorporated into the harvesting system (201) (FIG. 4); into the harvesting system (203) (FIG. 5); into the harvesting system (205) (FIG. 6 and FIG. 7); or into the harvesting system (207) (FIG. 10).

Harvest

Table 3 lists different elements of examples illustrated in FIGS. 4 to 10.

TABLE 3

| Number | Component | Description |
| --- | --- | --- |
| 200 | Overhead travelling crane | Structure on which the cutting unit moves, this perpendicular to the rails. |
| 201 | Harvesting system | Harvesting system, including cutting unit attached to a trailer. |
| 202 | Rails | Parallel metal bars upon which the overhead crane and harvesting unit move. |
| 203 | Harvesting system | Harvesting system, comprising the cutting unit, mounted on a metal framework. |
| 204 | Bogies | Mobile cart allowing the movement on rails. |
| 205 | Harvesting system | Harvesting system comprising the cutting unit, attached to an overhead crane. |
| 206 | Chassis frame | Rigid structure used to support the overhead crane. |
| 207 | Harvesting system | Harvesting system comprising the cutting unit mounted on a mobile metal framework attached to a self-propelled vehicle. |
| 208 | Load-bearing base | Base upon which all the mobile components rest |
| 210 | Tubular structure | Attaches rails and conveyor to the load-bearing base, while supporting the payload. |
| 212 | Junction | Piece that connects two rail sections. |
| 214 | Conveyor | Allows the transport of the harvested material. |
| 216 | Motor | Present at each of the rail sections, it powers the belt of the conveyor. |
| 218 | Wheel | Bearing system, which allows the movement of a rail section on the assembly, for the purpose of installation. |
| 220 | Pivot | Hinge that allows the deployment of a rail section. |
| 222 | Motor | Supplies energy to the pivot. |
| 224 | Hydraulic system | Powers the motors of the harvesting unit. |
| 226 | Mobile section | Sectional element grouping together rails, tubular structure, conveyor and load-bearing base. |
| 228 | Path | Allows access to the harvest area. |
| 230 | Truck | For transport outside the harvest area. |
| 232 | Operator | Manages field operations. |
| 233 | Harvest zone | Portion of land where gathering is carried out. |
| 234 | Harvested area | Portion of land where harvesting has already been carried out. |
| 236 | Pristine area | Portion of land not yet harvested. |
| 238 | Self-propelled unit | Autonomous vehicle incorporating a harvesting unit. |
| 240 | Motor | Motor allowing the movement of the self- |

TABLE 3-continued

| Number | Component | Description |
|---|---|---|
| | | propelled unit over the harvest area. |
| 242 | Side tank | Allows improvement of buoyancy of the self-propelled unit in wet environment. |
| 244 | Tracks | Articulated traction device, allowing movement on all types of terrain. |
| 246 | Metal framework | Supports the harvesting unit. |
| 248 | Tractor | Vehicle intended to tow a harvesting unit. |
| 250 | Attachment arm | Allows the attachment of a trailer to the tractor. |
| 252 | Trailer | Towed platform, location of the control station, connected to the harvesting unit. |
| 254 | Control station | Allows complete management of the harvesting unit. |
| 256 | Hydraulic actuators | Allows the control of the height of the harvesting unit with respect to the ground. |
| 258 | Trailer on skids | Towed platform, on which the harvesting unit is mounted. |
| 260 | Cable | Connected to the tractor, allows towing of the trailer on skids. |
| 262 | Skids | Allows the trailer to slide on the surface of the harvest area. |
| 266 | Lightened crosspiece | Allows support of the harvesting unit. |
| 268 | Lightened uprights | Allow support of the lightened crossbar. |

As illustrated in FIGS. 4, 5, 6, 7, 8, 9 and 10, the cutting unit (100) can move around the gathering area in different modes, which is to say according to the different harvesting systems used.

Figure 4:
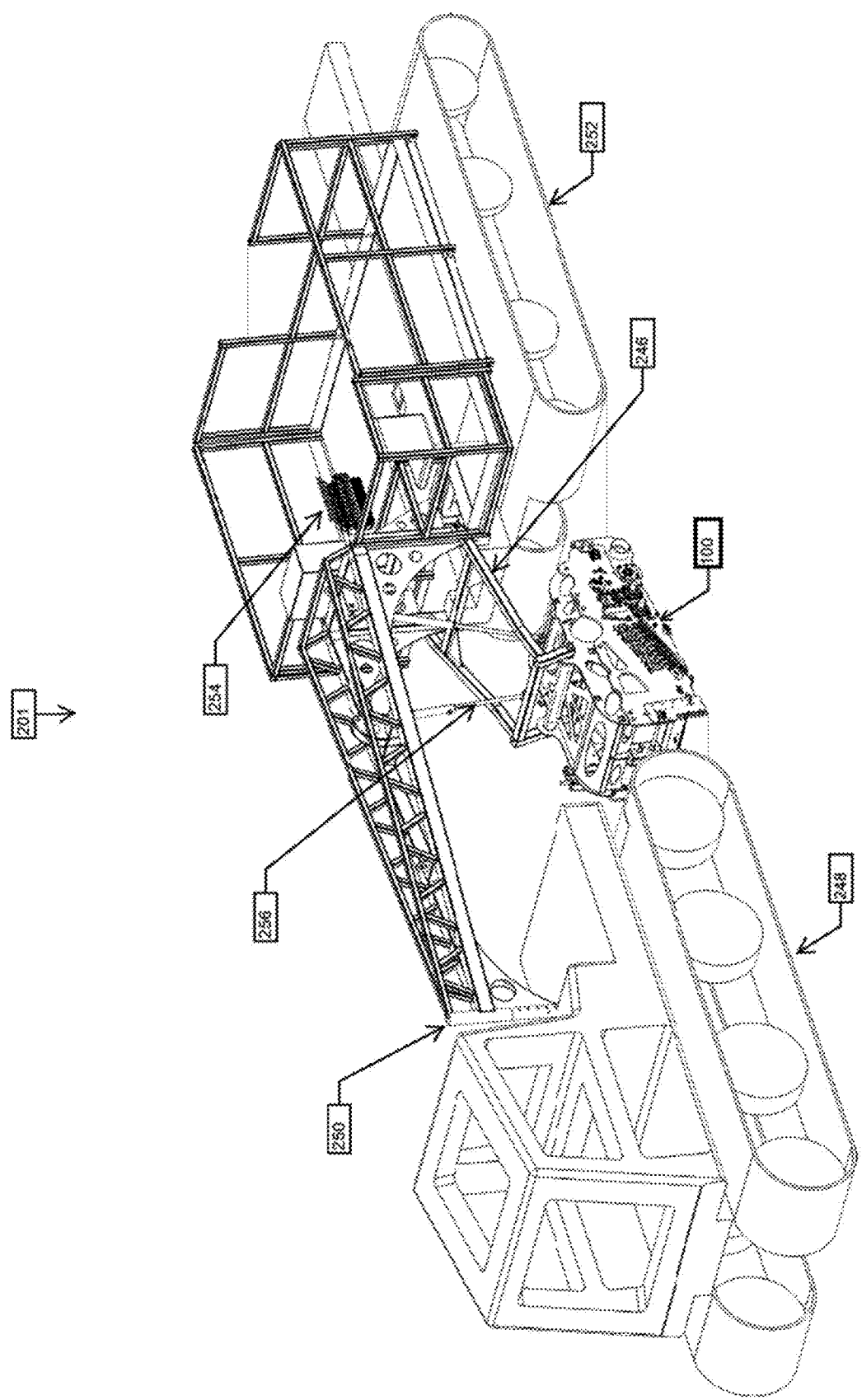
FIG. 4 is a perspective view of a harvesting system according to an example of this disclosure including a towed mode with tracks.

FIG. 4 shows the harvesting system (201) which comprises the cutting unit (100) attached to a trailer (252), location of the control station (254), by means of a mobile metal framework (246); this framework is connected to hydraulic actuators (256) anchored to the attachment arm (250) to allow its displacement around a vertical axis with respect to the ground. This attachment arm is hooked to a tractor (248) that is used to pull the assembly over the harvest area.

FIG. 10 shows the harvesting system (207) which comprises the cutting unit (100) mounted on a mobile metal framework (246), a framework attached to a self-propelled vehicle (238) equipped with tracks (244), the hydraulic system (224) of which powers the motor (240). This vehicle is equipped with flotation side tanks (242) to facilitate its movement in wet and sometimes flooded areas.

Figure 5:
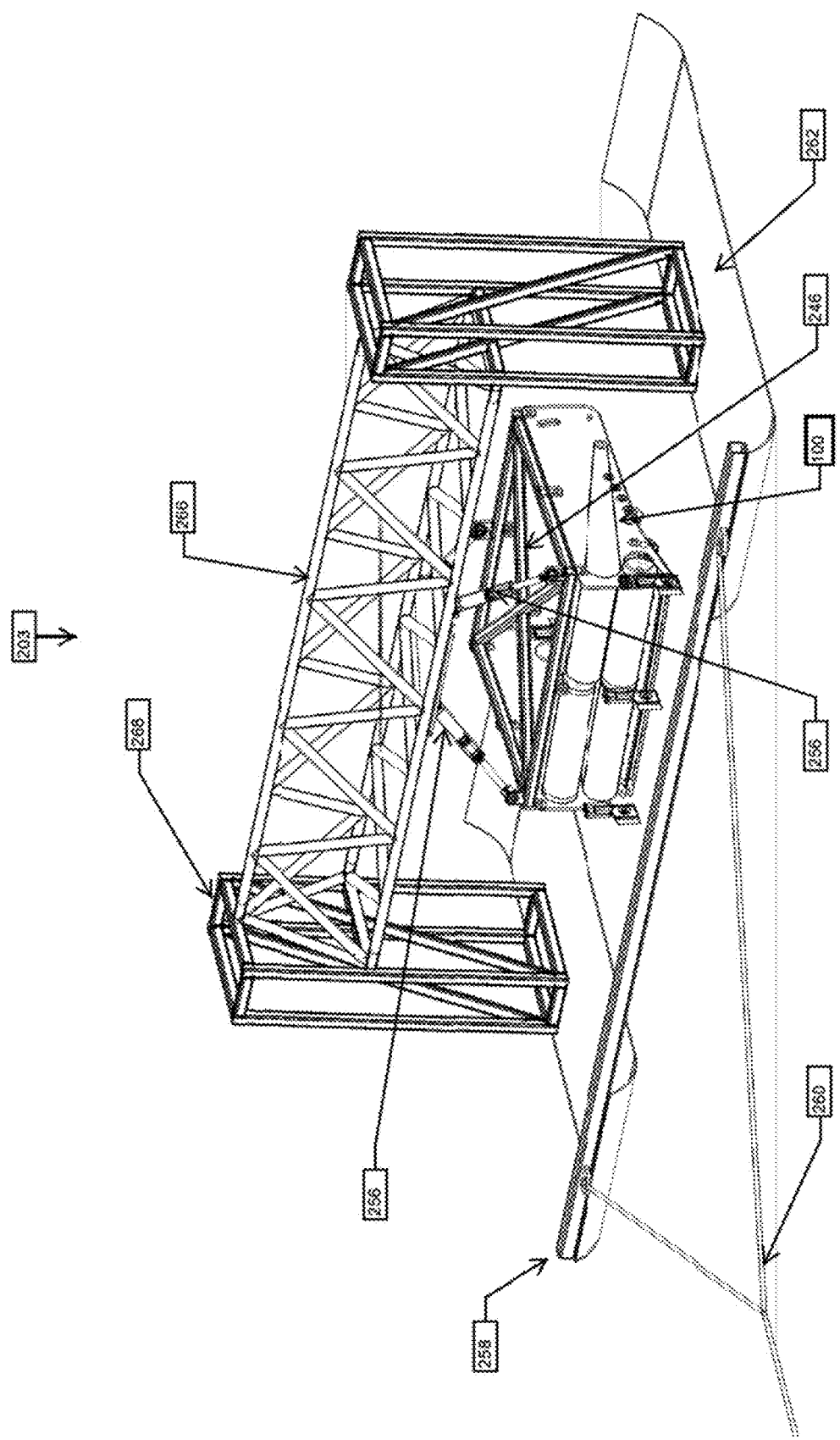
FIG. 5 is a perspective view of a harvesting system according to another example of this disclosure comprising a towed mode on skids.

FIG. 5 shows the harvesting system (203) which comprises the cutting unit (100) mounted on a metal framework (246) connected to hydraulic actuators (256) to allow it to move along a vertical axis with respect to the ground. These actuators are attached to a lightened metal crosspiece (266), which is supported at its ends by two lightened metal uprights (268). Each of these metal uprights rests on skids (262) in order to distribute the weight of the assembly on the ground and allow sliding on the surface of the harvest area. A cable (260) attached to the skids at one end and to a towed vehicle at the other makes it possible to move the trailer on skids (258) over the harvest area.

Figure 6:
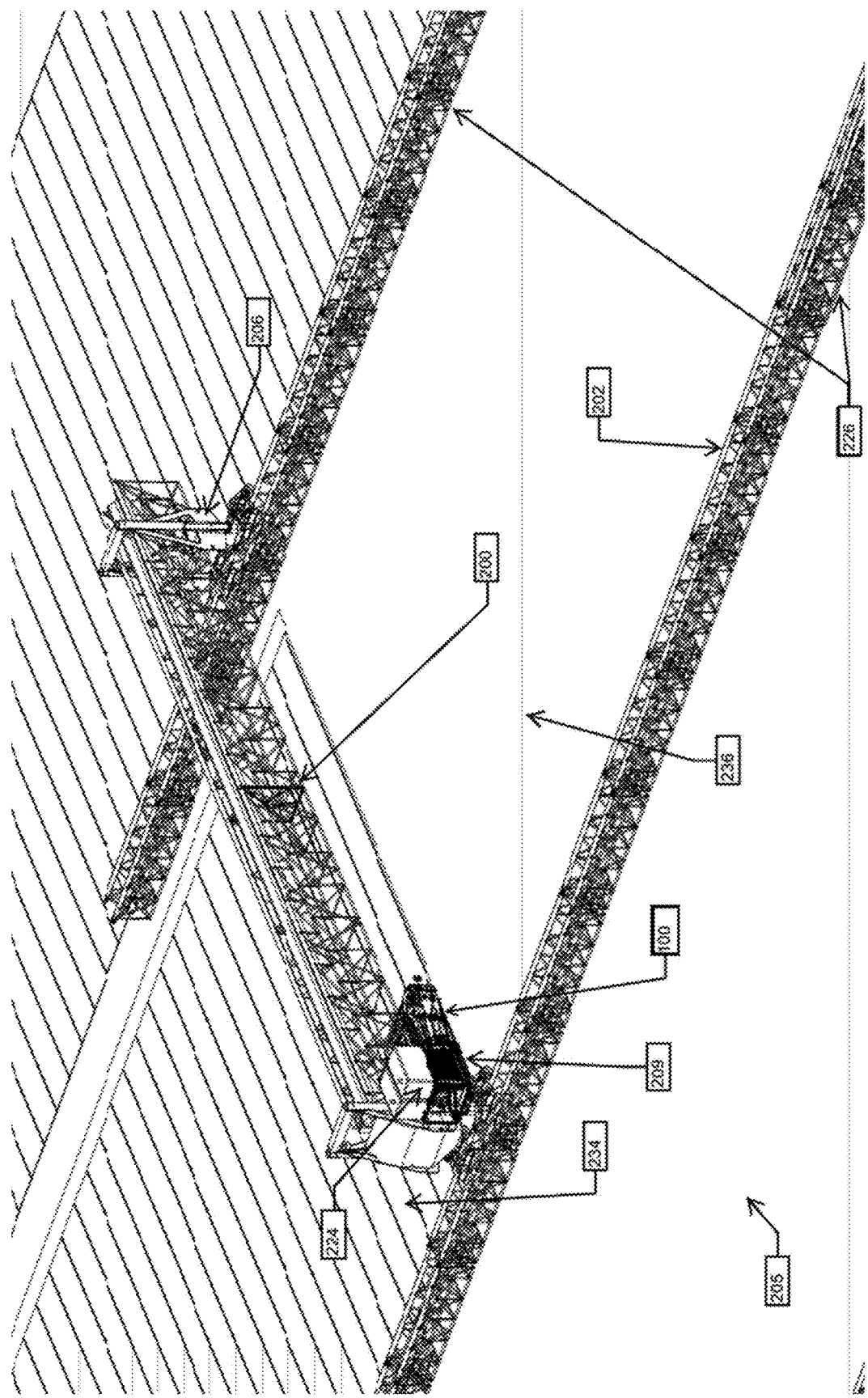
FIG. 6 is a perspective view of a harvesting system according to another example of this disclosure comprising a mode on rails.
Figure 7:
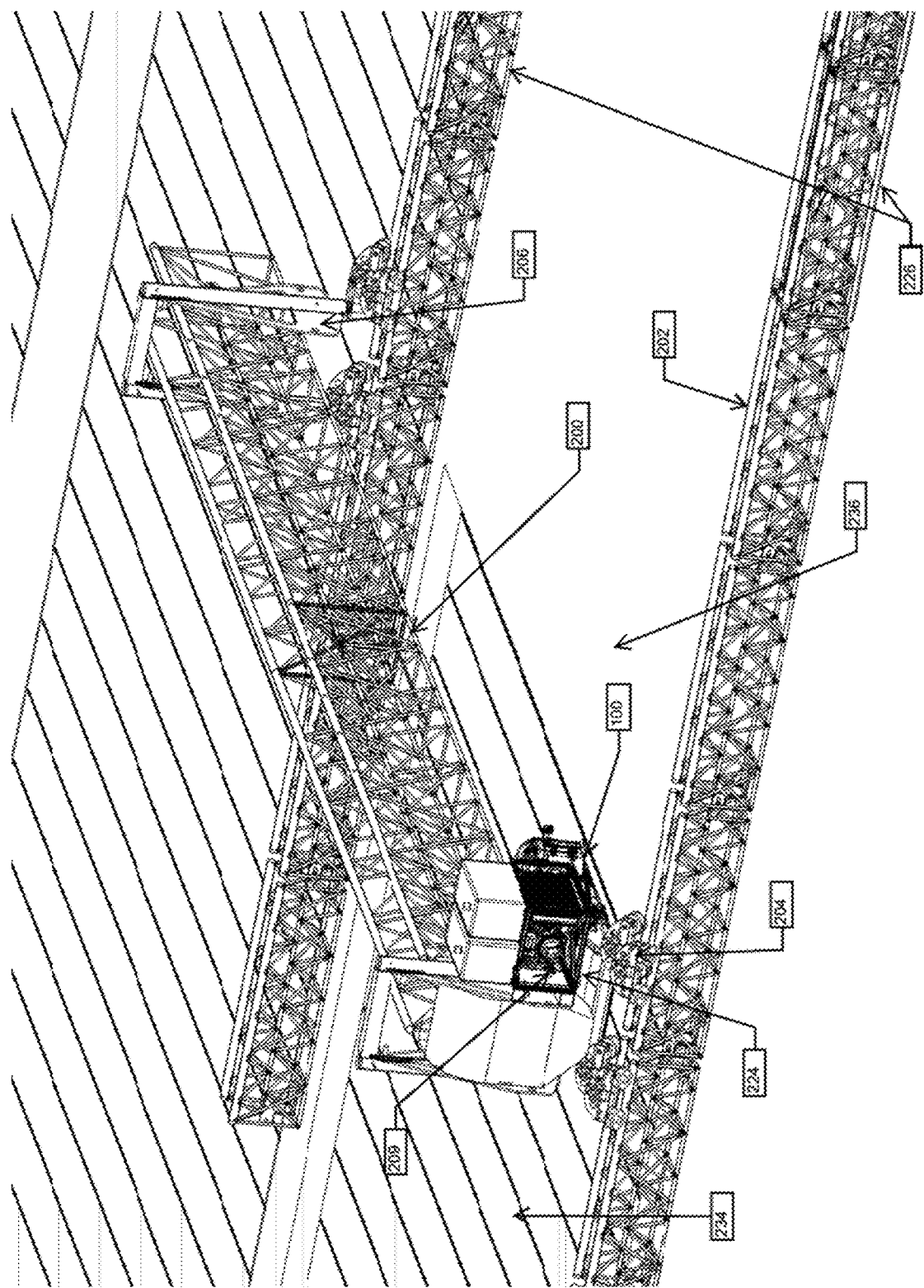
FIG. 7 is a perspective view of a harvesting system according to another example of this disclosure comprising a mode on rails.

FIG. 6 and FIG. 7 show the harvesting system (205) and a simplified representation of the cutting unit (100) attached to an overhead crane (200), which overhead crane is mounted on a rigid chassis frame (206) equipped with bogies (204). The cutting unit is moved by a hydraulic system (224) that powers the motors (209). This movement is perpendicular to the mobile sections (226) located on either side of the ends of the overhead crane. These sections, equipped with rails (202), allow the cutting unit (100) and the overhead crane to move from the harvested area (234) to the so-called pristine area (236).

Figure 8:
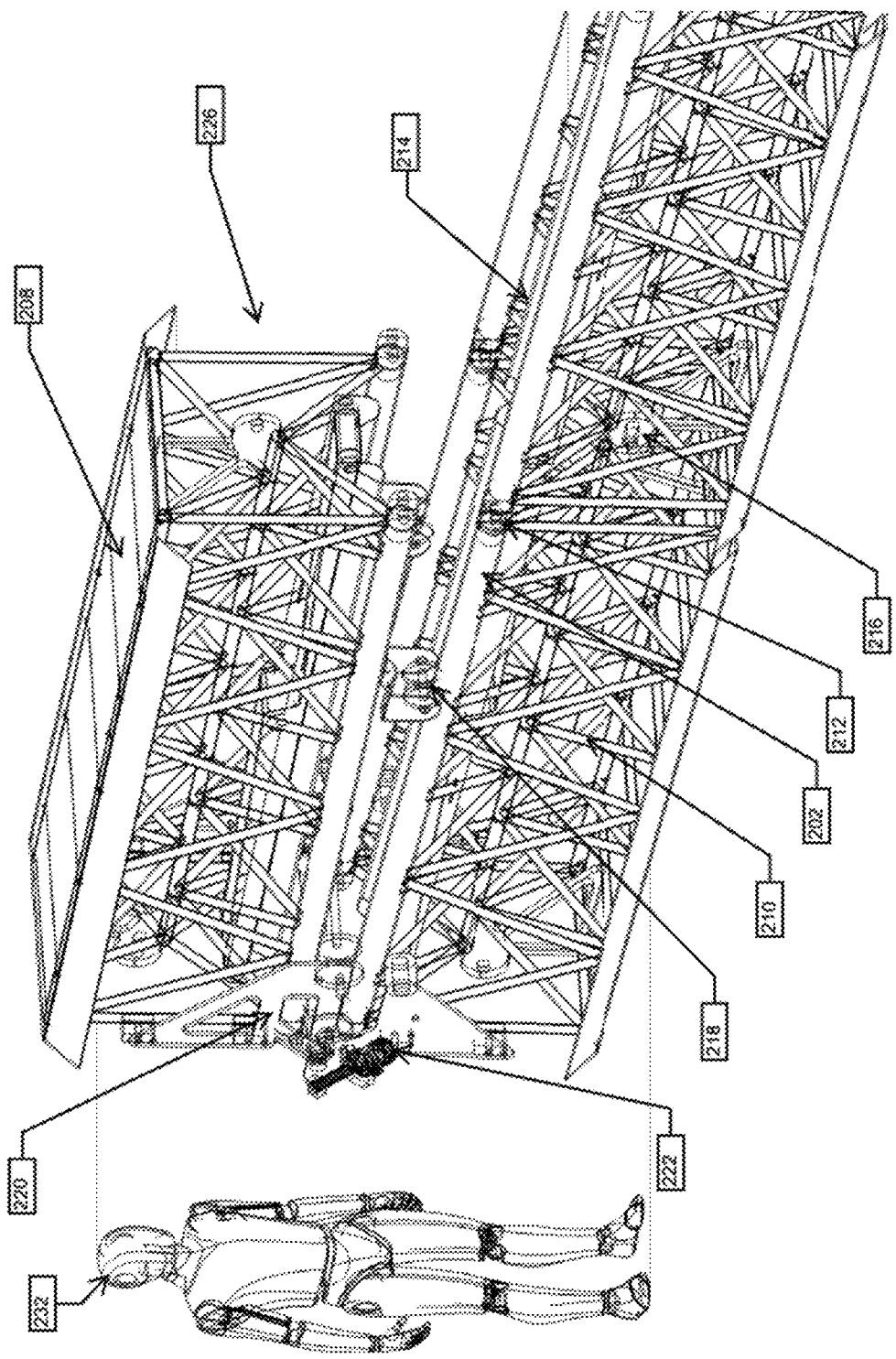
FIG. 8 is a perspective view of a harvesting system according to another example of this disclosure comprising a mode on rails.

FIG. 8 shows a detailed view of a mobile section (226) and its components at the scale of the operator (232). A tubular structure (210) supports the rail (202) and the load that is to rest on it. The weight is distributed thanks to a load-bearing base (208) that serves as a base on the ground. Each section is conveyed to its anchorage point by means of wheels (218) which allow it to move on the mobile sections already installed upstream. At the end of its run, it is attached to the others by means of a junction (212), once it is unfolded by means of a pivot (220) activated by a motor (222). Each mobile section is equipped with a motor (216) that powers the belt of the conveyor (214) where the harvested material is transported.

Figure 9:
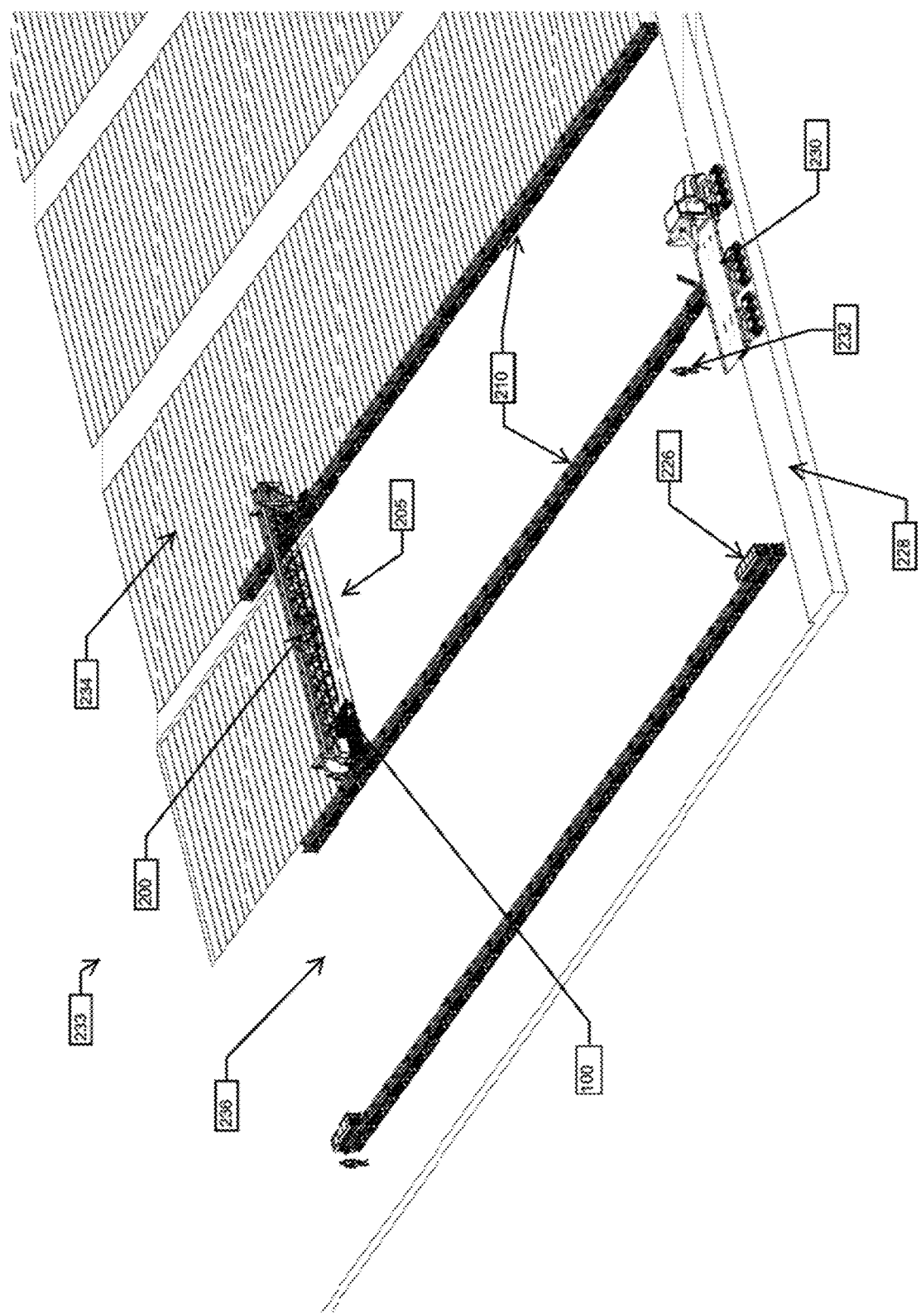
FIG. 9 is a perspective view of a harvesting system according to another example of this disclosure comprising a mode on rails.

FIG. 9 shows an aerial view of the harvest zone (233). It shows the cutting unit (100) attached to the overhead crane (200) which rests on a tubular structure (210) made up of an arrangement of mobile and removable sections (226). These sections are attached to each other and allow the harvesting system (205) to be redeployed on each of the areas making up the harvest zone, from the harvested cells (234) to the so-called pristine areas (236). The mobile sections are equipped with conveyor belts (see FIG. 8) that convey the sphagnum moss towards a land transport unit (230). Under the control of an operator (232), the moss is transhipped to this unit and then transported out of the harvest zone through an access path (228) provided for this purpose.

Figure 11:
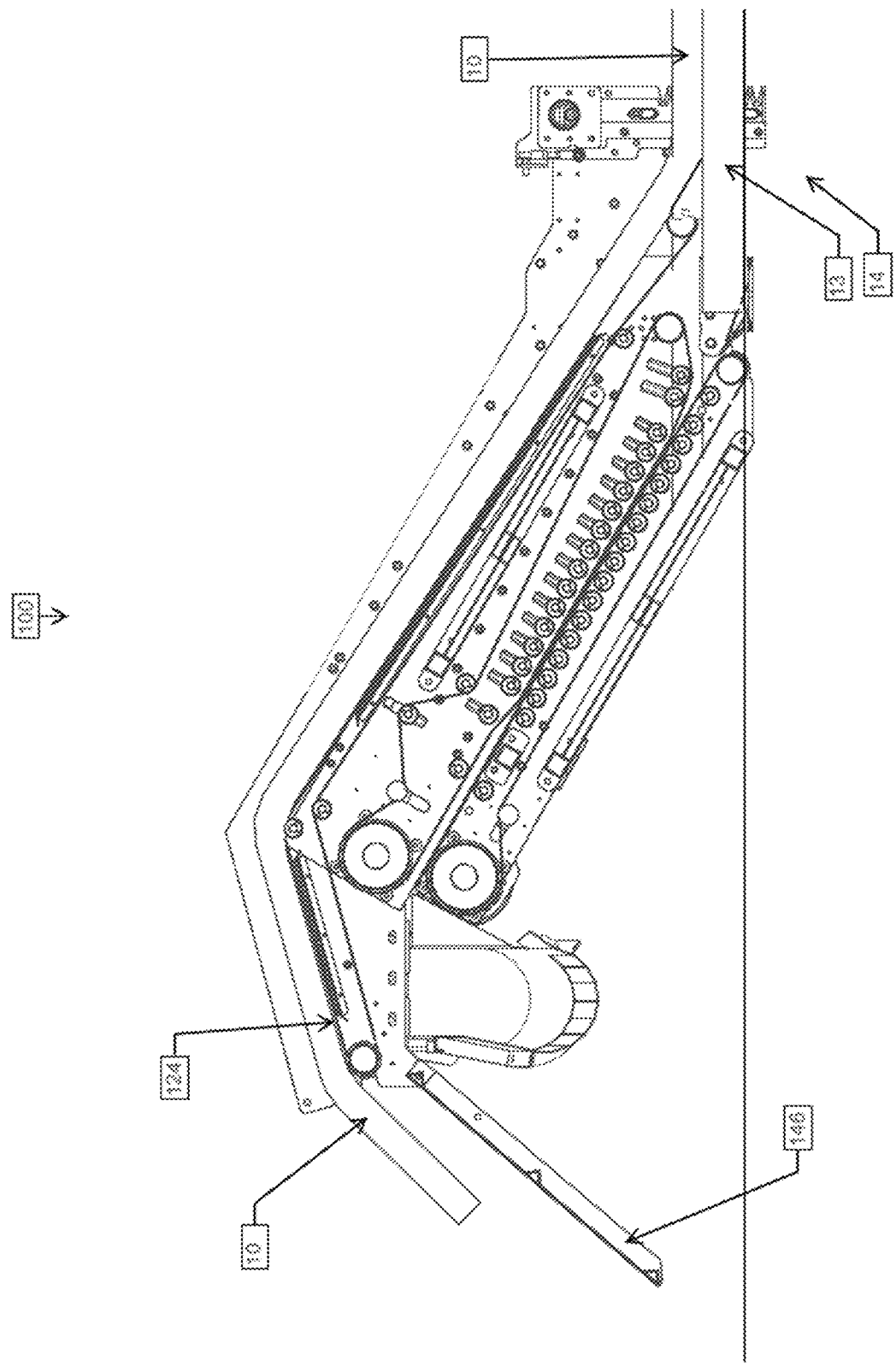
FIG. 11 is a side perspective view of a cutting unit according to another example of this disclosure.

FIG. 11 shows the cutting unit (100) that harvests the intermediate portion (13) and leaves the lower portion of the plant on the ground (14) upon which the apical portion (10) is redeposited. The operation is carried out by means of a transport belt (124) and a chute (146), all of this in such a manner as to reseed the harvest area and accelerate its recovery.

The description should be construed as illustrative of this technology but should not be considered to limit the claims. The claims should not be limited in scope by the examples but should be given the broadest interpretation consistent with the description as a whole.

The invention claimed is:

1. Cutting unit for cutting sphagnum moss from a ground surface, said unit comprising a first pair of horizontal powered parallel blades spaced apart from about 2 cm to about 30 cm and a second pair of vertical powered parallel blades spaced apart from about 40 cm to about 400 cm, said blades of said first pair and second pair being positioned and configured to cut said sphagnum moss in an intermediate portion while leaving said sphagnum moss anchored to said ground surface.

2. Cutting unit according to claim 1, wherein said first pair of horizontal powered parallel blades is a pair of chainsaws.

3. Cutting unit according to claim 2, wherein said chainsaws are configured such that said first pair of horizontal powered parallel blades comprises a first chainsaw disposed above a second chainsaw, said first chainsaw being advanced with respect to said second chainsaw so that when said cutting unit contacts an element to be cut, said element first contacts said first chainsaw and said element then contacts said second chainsaw.

4. Cutting unit according to claim 1, wherein said second pair of vertical powered parallel blades is a pair of chainsaws.

5. Cutting unit according to claim 1, wherein said second pair of vertical powered parallel blades is a pair of circular blades.

6. Cutting unit according to claim 2, wherein said second pair of vertical powered parallel blades is a pair of shear blades.

7. Sphagnum moss harvesting system comprising a cutting unit according to claim 1, and a motor for moving said cutting unit.

8. System according to claim 7, further comprising a rail system for supporting said cutting unit.

9. System according to claim 7, further comprising at least one roller for dewatering.

10. System according to claim 7, further comprising rollers for dewatering.

11. System according to claim 7, further comprising cylinders configured to exert a constant pressure on rollers for pre-dewatering.

12. Cutting unit for cutting sphagnum moss, said unit comprising a first pair of substantially parallel blades, laid out according to a first orientation, and spaced apart from about 2 cm to about 30 cm; and a second pair of substantially parallel blades, laid out according to a second orientation, and spaced apart from about 40 cm to about 400 cm; said blades of said first pair and second pair being positioned and configured to cut said sphagnum moss, wherein said first pair of blades is a pair of chainsaws, and wherein said chainsaws are configured such that said first pair of blades comprises a first chainsaw disposed above a second chainsaw, said first chainsaw being disposed horizontally and being advanced with respect to said second chainsaw so that when said cutting unit contacts an element to be cut, said element first contacts said first chainsaw and said element then contacts said second chainsaw.

13. Cutting unit according to claim 12, wherein said first orientation is horizontal.

14. Cutting unit according to claim 12, wherein said second orientation is vertical.

15. Cutting unit according to claim 12, wherein said second pair of blades is a pair of chainsaws.

16. Cutting unit according to claim 12, wherein said second pair of blades is a pair of circular blades.

17. Cutting unit according to claim 12, wherein said second pair of blades is a pair of shear blades.

18. Sphagnum moss harvesting system comprising a cutting unit according to claim 12, and a motor for moving said cutting unit.

19. System according to claim 18, further comprising a rail system for supporting said cutting unit.

20. System according to claim 18, further comprising at least one roller for dewatering.

21. System according to claim 18, further comprising rollers for dewatering.

22. System according to claim 18, further comprising cylinders configured to exert a constant pressure on rollers for pre-dewatering.

* * * * *